Patented July 19, 1949

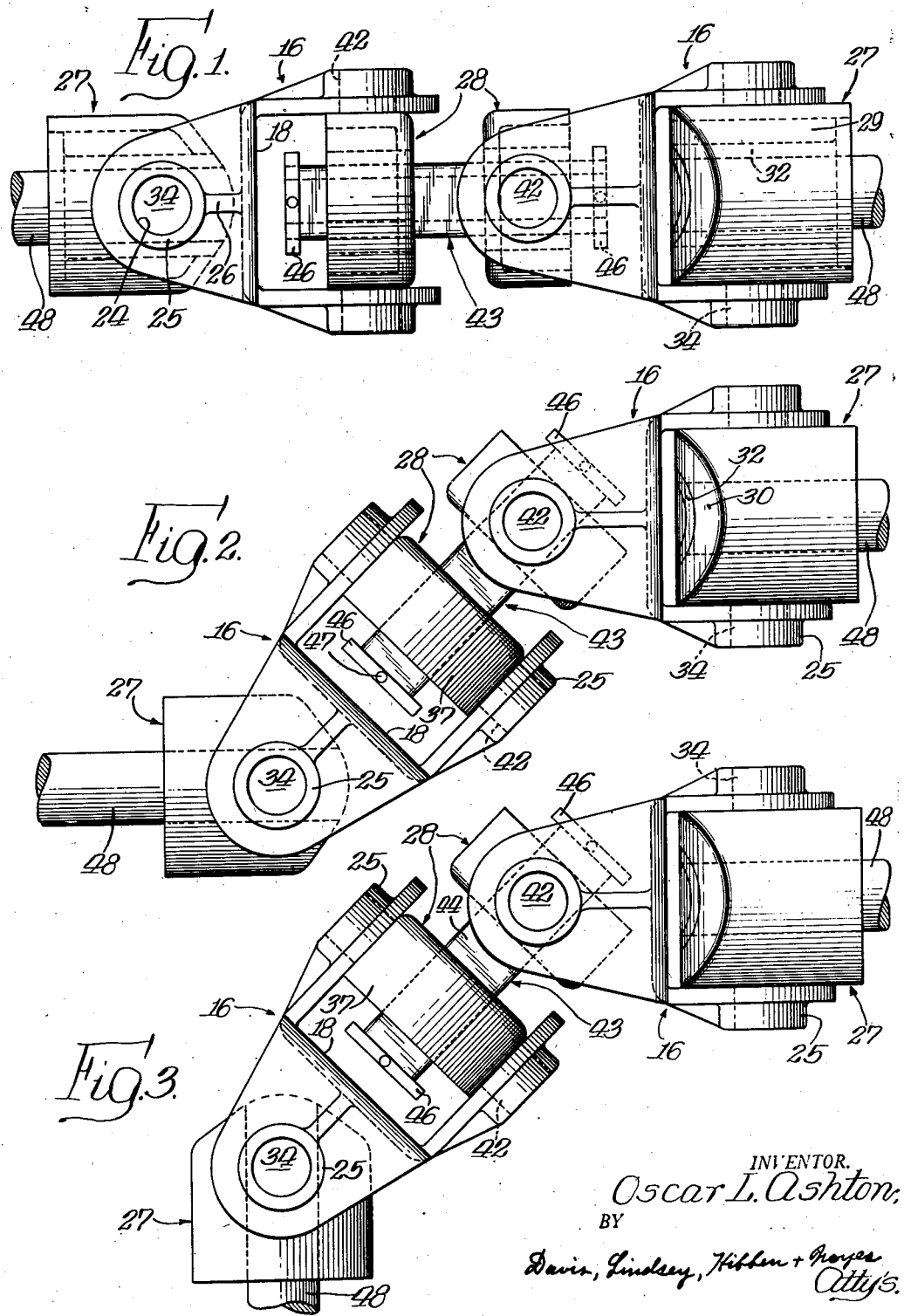

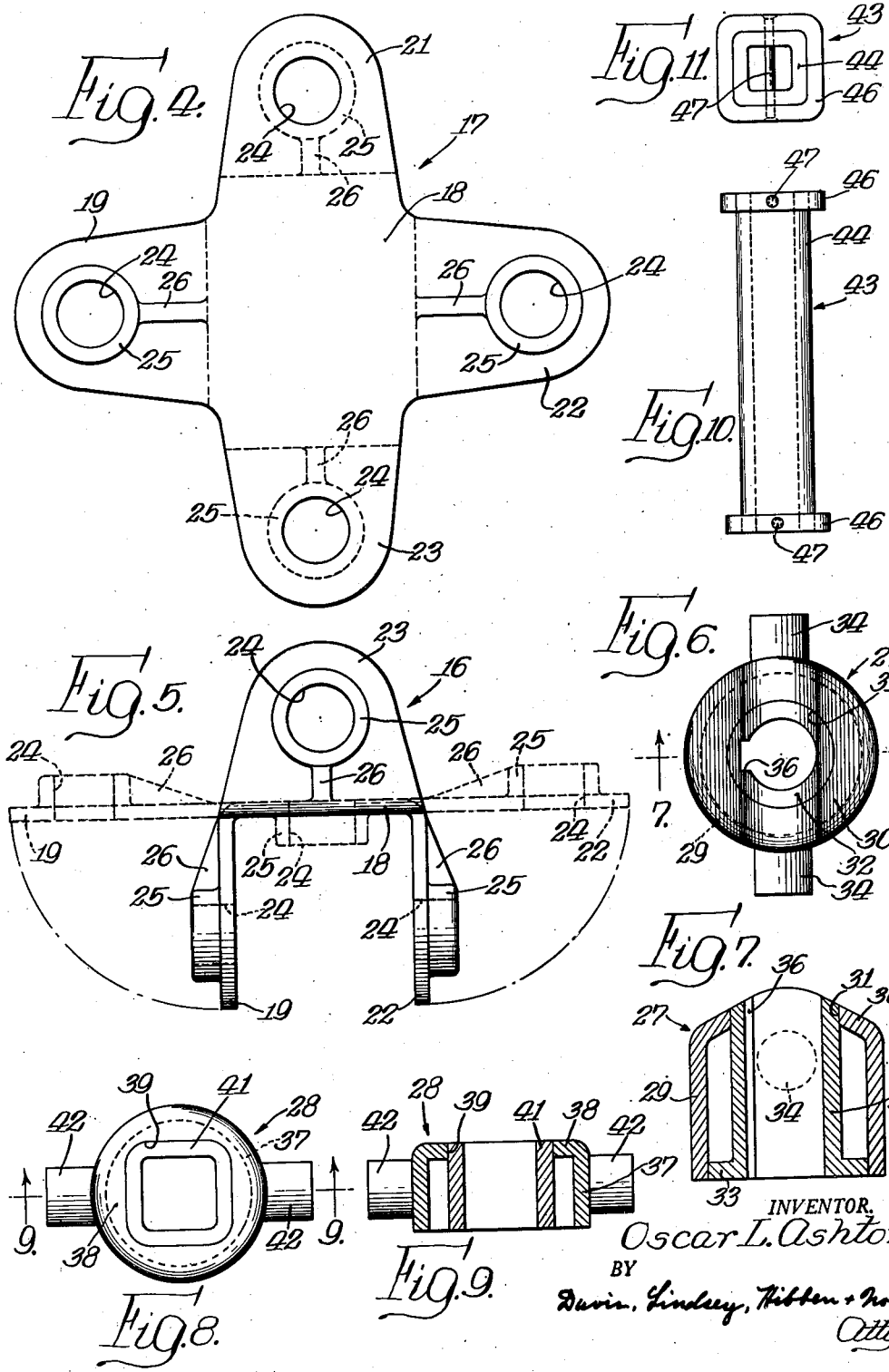
July 19, 1949.     O. L. ASHTON     2,476,473
UNIVERSAL COUPLING
Filed July 21, 1948     2 Sheets-Sheet 2
INVENTOR.
Oscar L. Ashton,
BY
Davis, Lindsey, Hibben & Noyes
Attys.

2,476,473

UNITED STATES PATENT OFFICE 2,476,473

UNIVERSAL COUPLING

Oscar L. Ashton, Harvey, Ill.

Application July 21, 1948, Serial No. 39,971

3 Claims. (Cl. 64—17)

This invention relates to universal or flexible couplings, and more particularly to universal couplings for use under relatively light loads.

Universal couplings are usually employed in combination with power driven machinery as a means for flexibly connecting a driving shaft with a driven shaft for the transmission of power therebetween regardless of the degree of axial alignment or misalignment of the shafts, e. g. in the transmission mechanisms of automobiles, trucks, etc. Consequently, a universal coupling intended for such uses must be of strong and rugged construction designed to withstand the shocks, heavy loads, and high speeds incident to its use. The various parts of the coupling, such as the forks or yokes and trunnion members, are usually provided in the form of strong, heavy castings or forgings.

However, universal or flexible couplings are also highly useful for other purposes which do not involve sustained operation at high speeds and under heavy loads. For example, in the operation of valves and other types of controls disposed at elevated or other inconvenient locations, it is often desirable to have operating handles positioned at a central or easily accessible location remote from the valves per se. A typical illustration is in the case of the boiler rooms of ships or other marine power plants in which manipulation of the various valves of the boiler system is greatly facilitated by installing elongated handles extending downwardly toward the floor level and connected to the valve stems by means of universal or flexible couplings to permit operation of the valves regardless of the relative axial positions of the valve stems and the elongated handles. For such uses it is highly desirable to have an inexpensive, light weight, easily fabricated universal joint adapted to operate under comparatively light loads at low speeds.

Accordingly, a primary object of my invention is to provide a universal coupling of light weight construction suitable for uses which do not involve heavy loads and high speeds.

A further object of the invention is to provide an inexpensive universal coupling which is easily fabricated from sheet metal and does not require heavy, expensive cast or forged parts.

Another object of the invention is to provide a simple light weight universal coupling adapted for use with remote control handles for valves and the like.

Other objects and advantages of the invention will become apparent by reference to the subsequent detailed description of the invention and the accompanying drawings, in which:

Fig. 1 is a view in side elevation of the assembled universal coupling of my invention showing the positions of the parts of the device when the driving and driven shafts are in axial alignment;

Fig. 2 is a side elevational view similar to Fig. 1 but showing the positions of the parts when the driving and driven shafts are parallel to each other;

Fig. 3 is a side elevational view similar to Figs. 1 and 2 but showing the positions of the parts when the driving and driven shafts are disposed at an angle to each other;

Fig. 4 is a plan view of a sheet metal blank from which is formed a double yoke member constituting an element of the universal coupling of my invention;

Fig. 5 is an elevational view of the double yoke member formed from the blank shown in Fig. 4;

Fig. 6 is a plan view of a shaft-mounting member constituting another element of the universal coupling of the present invention;

Fig. 7 is a vertical sectional view of the shaft-mounting member taken along the line 7—7 of Fig. 6;

Fig. 8 is a plan view of a center member constituting another element of the universal coupling of my invention;

Fig. 9 is a vertical sectional view of the center member taken along line 9—9 of Fig. 8;

Fig. 10 is an elevational view of a connector shaft contituting still another element of the universal coupling of the present invention; and Fig. 11 is an end view of the connector shaft shown in Fig. 10.

The universal coupling of my invention comprises generally a pair of similar rotatable coupling units each comprising a double yoke member having a shaft-mounting member journalled in one yoke portion thereof and a center member journalled in the other oppositely extending yoke portion thereof. The shaft-mounting members are adapted to be attached to the driving and driven shafts for rotation therewith. An elongated connector shaft extends between the respective center members for drivingly connecting the two halves or units of the coupling. The double yoke members, shaft-mounting members, and center members are formed in a novel manner from relatively light gauge sheet metal, utilizing conventional punching, drawing, and bending operations.

Referring now to the drawings, which illustrate merely by way of example one specific embodiment of my invention, Figs. 4 to 11 show the detailed construction of the several elements of the device, and Figs. 1 to 3 show the assembled coupling in various operating positions.

As hereinbefore mentioned, the coupling as a whole comprises two coacting coupling units which are of identical construction and, therefore, only one of these units will be described in detail. The principal element of each coupling unit is a double yoke member indicated generally at 16 in Fig. 5. The double yoke member 16 is formed from a sheet metal blank, indicated generally at 17 in Fig. 4, having a generally rectangular, flat base or central portion 18 and four symmetrically disposed ears 19, 21, 22, and 23 extending respectively from the four sides of the base portion 18. The blank 17 may be punched out of sheet metal stock of relatively light gauge, each of the ears 19, 21, 22, and 23 being provided with a central aperture or opening 24 surrounded by an upright annular rim or boss 25 formed by a drawing operation. The bosses 25 on the oppositely disposed ears 19 and 22 extend perpendicularly from one flat side of the blank 17, whereas the bosses 25 on the oppositely disposed ears 21 and 23 extend perpendicularly from the other flat side of the blank 17. A stiffening web 26 may be provided, which extends radially from the outer periphery of each of the bosses 25 and inwardly toward the base portion 18.

The sheet metal blank 17 having apertured and embossed ears, as shown in Fig. 4, is then subjected to a forming or bending operation in which the oppositely disposed ears 19 and 22 are bent away from the plane of the base portion 18 to form a pair of spaced parallel arms constituting a first yoke position (Fig. 5), and the oppositely disposed ears 21 and 23 are also bent away from the plane of the base portion 18, but in an opposite direction with respect to the ears 19 and 22, thereby forming a second or oppositely extending yoke portion. In Fig. 5 an edgewise or elevational view of the blank 17 is shown in broken lines and the completed double yoke member 16 is shown in solid lines. It will be seen that the oppositely extending yoke portions formed by the ears 19, 22 and 21, 23 have a common axis, and the openings 24 in the respective arms of each of the yoke portions are aligned on an axis normal to and intersecting the common axis of the yoke portions. Thus, the axes of the aligned openings 24 in the respective yoke portions are disposed in planes at 90 degrees with respect to each other, or in other words, the oppositely extending yoke portions are turned 90 degrees relative to each other about their common axis.

Journaled in the oppositely extending yoke portions of the double yoke member 16, as shown in Figs. 1, 2, and 3, are a shaft-mounting member 27 illustrated in detail in Figs. 6 and 7 and a center member 28 illustrated in detail in Figs. 8 and 9.

The shaft-mounting member 27 comprises a drawn sheet metal cup 29 having a tapered end portion 30 provided with a central aperture 31 therethrough. A tubular bushing 32 is disposed within the cup 29 and is secured at one end thereof to the periphery of the opening 31 as by welding. An annular flange 33 is provided at the opposite end of the bushing 32 and is secured peripherally within the cup 29 at the other end thereof. Oppositely extending trunnion members 34 are secured, as by welding, to the outer periphery of the cup 29 adjacent the end portion 30 thereof on an axis normal to and intersecting the axis of the bushing 32. The trunnions 34 are adapted to be rotatably received in the aligned openings 24 of one of the yoke portions of the double yoke member 16. A longitudinal groove or keyway 36 may be provided in the inner wall of the bushing 32 in order to secure the shaft-mounting member 27 to either the driving or driven shafts, as the case may be.

The center member 28 comprises a drawn sheet metal cup 37, of lesser axial height than the cup 29, having a flat end wall 38 with a central aperture 39 therethrough of polygonal cross-section, and preferably rectangular or square as shown in Figs. 8 and 9. A tubular bushing 41 having a polygonal cross-section conforming to the aperture 39 is positioned within the cup 37 and one end thereof is fastened to the inner periphery of the aperture 39. Oppositely extending trunnion members 42 are secured to the outer periphery of the cup 37 on an axis normal to and intersecting the axis of the bushing 41 for journalling the center member 28 in the aligned openings 24 of the other yoke portion of the double yoke member 16.

In Figs. 10 and 11, a connector shaft 43 is shown for inter-connecting the two halves or coupling units of the device in a manner hereinafter described in detail. The connector shaft 43 comprises an elongated tubular member 44 having a rectangular or square external cross-section adapted to fit within the square bushings 41 of the center members 28 on an axis normal to and intersecting the axes of rotation of the center members 28 relative to their supporting yoke portions. Annular stop collars 46 are provided at opposite ends of the tubular member 44 and are secured thereto by means of transversely extending pins 47.

In the complete universal joint, as shown in Figs. 1 to 3, each of the double yoke members 16 has journalled in the outermost yoke portion thereof a shaft-mounting member 27, the tapered end portion thereof extending toward the base portion 18 of the double yoke 16 and the trunnions 34 being rotatably mounted within the aligned openings 24. A shaft member 48, either the driving or driven shaft as the case may be, fits within the bushing 32 and is keyed for rotation therewith by means of the groove 36 and a cooperating key on the shaft. A center member 28 is journalled in the innermost side or yoke portion of each of the double yoke members 16, the open end of the cup 37 facing the base portion 18 of the double yoke 16 and the trunnions 42 being rotatably disposed in the aligned openings 24.

The elongated square tube 44 of the connector shaft 43 extends at its opposite ends through the square bushings 41 in the respective center members 28, and the stop collars 46, secured to the ends of the tube 44 by means of the pins 47, retain the tube 44 within the center members 28 thereby holding the two units of the coupling device together for driving operation.

In Figure 1 the coupling device is shown with the respective coupling units and the driving and driven shafts 48 disposed for operation in straight-line axial alignment.

In Fig. 2 the shafts 48 are disposed in spaced parallel arrangement with the left-hand shaft-mounting member 27 being pivoted relative to the axis of its supporting yoke portion. It will be seen that the tapered end portion 30 of the cup 29 and the location of the trunnions 34 adjacent the tapered end cooperate to facilitate pivoting movement of the shaft-mounting member 27 and to provide the necessary clearance from the flat base portion 18.

In Fig. 3 the shafts 48 are connected at an angle to each other, the left-hand shaft-mounting member 27 again being pivoted relative to the axis of its supporting yoke portion.

Thus, my invention provides an inexpensive and readily constructed universal or flexible coupling the major parts of which can be fabricated from sheet metal of a gauge readily shaped by conventional metal working techniques. The device is adapted for numerous uses requiring a flexible coupling operable over a wide angular range but avoids the heavy, expensive construction inherent in the universal joints previously available and designed for heavy duty power transmission.

Although the invention has been described with reference to one specific structural embodiment, it will be apparent that various modifications and equivalent structures may be employed without departing from the scope of the invention as defined in the appended claims.

I claim:

1. A universal coupling for operatively connecting a driving shaft with a driven shaft, comprising a pair of similar rotatable coupling units; each of said units comprising a double yoke member having a flat base portion and four ears bent away from the plane of said base portion to form a pair of oppositely opening yoke portions, said yoke portions being turned 90 degrees relative to each other about a common axis, a cup-like shaft-mounting member having an axial opening therethrough adapted to receive and to be rigidly secured to one of said shafts for rotation therewith, said shaft-mounting member being journalled in one of said yoke portions, and a cup-like center member having an axial opening of polygonal cross-section therethrough and journalled in the other of said yoke portions; a connector shaft of polygonal external cross-section conforming to the polygonal openings in the respective center members of said units and having its opposite ends extending into said polygonal openings for drivingly connecting said units; and stop members disposed at said opposite ends of said connector shaft for retaining the same within the center members.

2. A universal coupling for operatively connecting a driving shaft with a driven shaft, comprising a pair of similar rotatable coupling units; each of said units comprising a double yoke member having a flat substantially rectangular base portion and four apertured ears extending from the respective sides of said base portion, two oppositely disposed ears being bent in one direction away from the plane of said base portion and the other two oppositely disposed ears being bent in the opposite direction away from the plane of said base portion, thereby forming oppositely extending pairs of spaced parallel arms, each of said pairs of arms constituting a yoke portion having aligned apertures disposed on an axis normal to and intersecting the axis of the yoke portion and the respective yoke portions having a common axis, a cup-like shaft-mounting member having an axial opening therethrough adapted to receive and to be rigidly secured to one of said shafts for rotation therewith, said shaft-mounting member being journaled in the aligned openings in one of said yoke portions on an axis normal to and intersecting the axis of the opening through said shaft-mounting member, and a cup-like center member having an axial opening of rectangular cross-section therethrough, said center member being journalled in the aligned openings of the other of said yoke portions on an axis normal to and intersecting the axis of said rectangular opening; and a connector shaft of rectangular external cross-section conforming to the rectangular openings in the respective center members of said units and having its opposite ends extending into said rectangular openings on an axis normal to and intersecting the axes of rotation of the center members relative to their respective supporting yoke portions for drivingly connecting said units, said connector shaft being provided with stop collars at its opposite ends for retaining the same within the center members.

3. A universal coupling for operatively connecting a driving shaft with a driven shaft, comprising a pair of similar rotatable coupling units; each of said units comprising a double yoke member, a shaft-mounting member journalled in one side of said double yoke member and adapted to be secured to one of said shafts, and a center member journalled in the other side of said double yoke member; and a connector shaft extending between the respective center members of said units for drivingly connecting the latter; said double yoke member being formed from sheet metal and comprising a flat base portion and four ears bent away from the plane of said base portion to form oppositely opening yoke portions turned at 90 degrees relative to each other about a common axis; said shaft-mounting member comprising a sheet metal cup having a tapered end portion and an axial opening therein, a tubular bushing secured in said opening, and oppositely extending trunnions secured to the outer periphery of the cup adjacent said end portion for journalling said shaft-mounting member in one of said yoke portions; and said center member comprising a sheet metal cup of lesser axial height than said shaft-mounting member and having an axial opening of polygonal cross-section in the end wall thereof, a tubular bushing secured in said polygonal opening and adapted to receive said connector shaft, and oppositely extending trunnions secured to the outer periphery of the cup for journalling said center member in the other of said yoke portions.

OSCAR L. ASHTON.

REFERENCES CITED

The following references are of record in the file of this patent:

UNITED STATES PATENTS

| Number | Name | Date |
| --- | --- | --- |
| 1,284,984 | Barnes | Nov. 19, 1918 |
| 1,896,901 | Knapp et al. | Feb. 7, 1933 |

FOREIGN PATENTS

| Number | Country | Date |
| --- | --- | --- |
| 1,337 | Great Britain | 1890 |